Dec. 14, 1926.
M. L. MUNCIE
1,610,305
ANTIGLARE SCREEN
Filed April 8, 1925
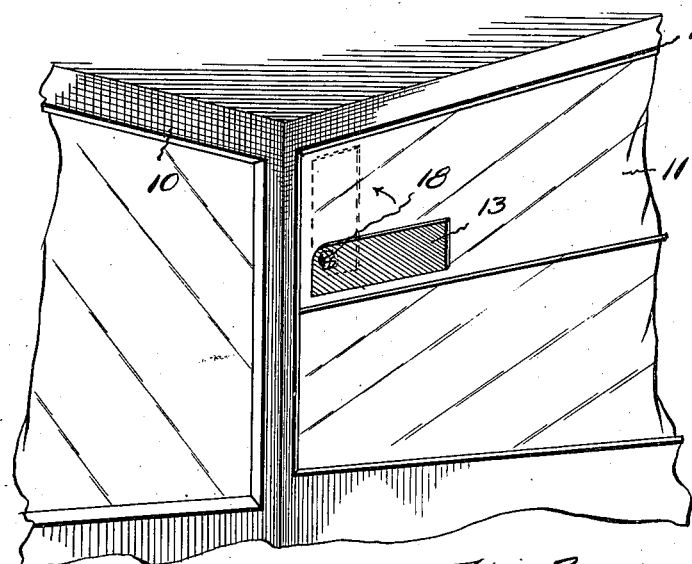
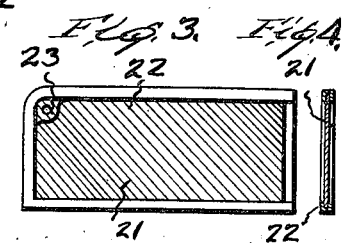
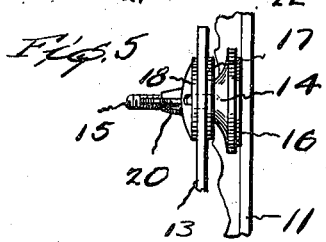
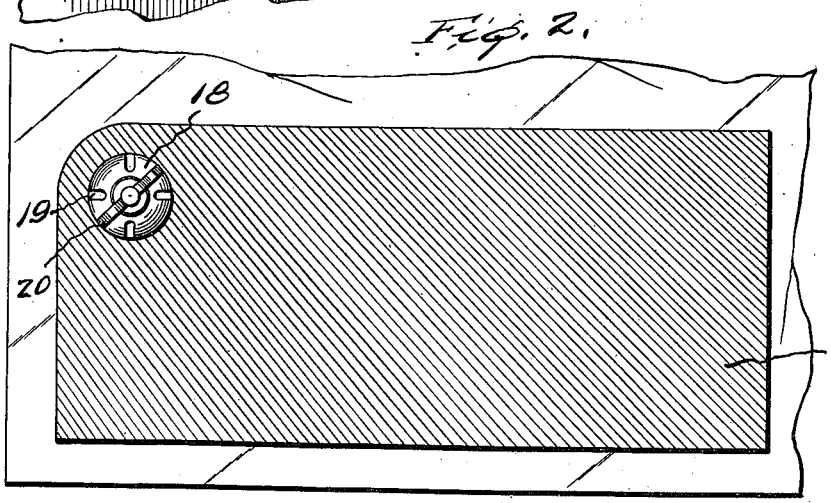
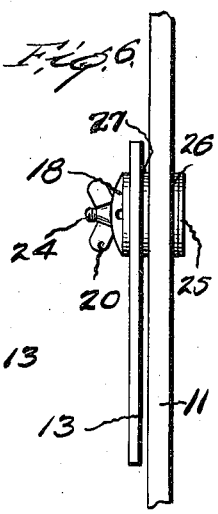
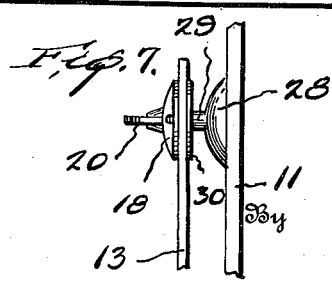
Inventor
MAURICE L. MUNCIE
WITNESS
E. A. Block.
Attorney Patented Dec. 14, 1926.

1,610,305

UNITED STATES PATENT OFFICE.

MAURICE L. MUNCIE, OF LEBANON, TENNESSEE.

ANTIGLARE SCREEN.

Application filed April 8, 1925. Serial No. 21,686.

This invention relates to improvements in anti-glare devices adapted to be used in connection with automobiles and the like.

An important object of the invention is to provide a device of the above character which may be mounted in association with a vehicle to prevent the glare of approaching vehicle headlights in the eyes of the operator.

A further object of the invention is the provision of a device of the above character which may be readily mounted upon a wind shield of a vehicle to shield the operator from the glare of the sun during the day and the glare of approaching headlights at night.

A still further object of the invention is the provision of an anti-glare device of this character which may be readily moved to operative or inoperative positions.

A still further object of the invention is to provide an anti-glare device which is extremely simple in construction yet durable, and efficient for this purpose.

Other objects and advantages of this invention will become apparent as the description progresses.

In the accompanying drawing forming a part of this specification and in which like numerals are employed to designate corresponding parts throughout the same:

Figure 1 is a perspective view of a portion of a vehicle showing my device mounted in operative position thereon, Figure 2 is an enlarged front elevation of the device mounted in association with a wind shield of a vehicle, Figure 3 is a front elevation of a modified form of screen, Figure 4 is a vertical sectional view taken therethrough, Figure 5 is a side elevation of the preferred form of attaching means, Figure 6 is a side elevation of a modified form of attaching means, and Figure 7 is a similar view of still another form of attaching means.

In the drawings, wherein for the purpose of illustration is shown the preferred embodiment of my invention, the numeral 10 generally designates the body of an automobile having mounted in the front portion thereof the usual wind shield 11. It is customary to provide a metallic frame indicated at 12 about the wind shield to protect the same against accidental breaking. As is well known, the wind shield is constructed of plain transparent glass and formed of upper and lower sections.

My invention resides more especially in means to be associated with the wind shield for the protection of the operator against the glare of the sun while driving during the day and the glare of approaching vehicle headlights at night. I have shown my improved device mounted on the upper wind shield section as the line of vision of the average operator is through this section.

Referring now more specifically to the construction of my device, the numeral 13 designates my improved screen which is substantially rectangular in formation and constructed of transparent material such as celluloid, glass or the like and preferably green or amber colored to minimize the glare of the sun or artificial light. It is particularly desirable to so mount the screen upon the wind shield that the same may be conveniently moved to operative or inoperative positions. I accomplish this by the provision of suitable attaching means comprising in the preferred form as shown at Figure 5, a wooden or metallic base 14 of substantially frusto-conical construction and provided with a central bore therethrough. Mounted through the said bore is a bolt 15 externally screw threaded on one end and secured at the other end to a rubber disk 16. This disk is secured to the base member 14 by adhesive or in any suitable manner and contacts with the inner side of the wind shield, being also secured thereon by a suitable adhesive. A conventional type of metallic washer 17 provided with a suitable aperture is then placed upon the bolt and engages the outer extremity of the base member 14 forming a suitable bearing for the screen 13 which is then inserted upon the bolt. The screen is then retained against displacement by the provision of a cup shaped washer 18, clearly shown in Figures 2 and 5, provided with a plurality of radial slots 19 to make the same resilient. A wing nut 20 provided with an internally threaded bore is then threadedly engaged with the extremity of the bolt 15 and tightly retains the screen in position.

With reference to Figures 3 and 4, the numeral 21 indicates the transparent screen body, in this instance, provided about the edges thereof with a frame 22 which may be of aluminum or similar construction and having formed in one corner of the screen adjacent the aperture therein an extension flange 23 to permit convenient mounting of the attaching means.

The modified form of attaching means illustrated in Figure 6, comprises a bolt 24 externally threaded on one extremity and carrying a disk 25 on the opposite extremity. In using this form of attachment it is necessary that the wind shield be drilled to provide a suitable recess for the insertion of the bolt 24, a suitable washer 26 preferably of rubber being mounted between the disk 25 and wind shield. A second rubber washer 27 is then inserted over the bolt and contacts with the opposite side of the wind shield after which the screen 13 is mounted in position. In this embodiment it is also desirable to place another washer on the outer side of the screen after which the resilient cup-shaped washer 18 is inserted upon the bolt. The structure is then secured by means of the threaded wing nut 20 and the screen mounted readily movable relative to the wind shield.

Another modified form of attaching means is illustrated in Figure 7 this form including a cup-shaped base member 28 having formed an extension sleeve 29 to which is secured an externally threaded bolt. A washer is then positioned over the bolt in contact with the sleeve 29 and the screen mounted in position. A second washer may be then positioned in contact with the outer screen and the resilient cup-shaped washer placed thereon after which the wing nut is threadedly mounted on the end of the bolt for retaining the device in position. In this form of the device the attachment is made by the cup shaped base member 28 which is preferably constructed of rubber and retained in association with the wind shield by the vacuum therein.

In use, it is apparent that my improved screen may be very readily secured upon the common forms of automobile wind shields and if desirable may be mounted upon the metallic frame of the wind shield in any suitable manner.

When the vehicle is being driven without the necessity of operation thereof, the screen is retained in the vertical position indicated by the dotted lines in Figure 1, permitting the operator to have an unobstructed vision directly before him. When, while driving, the operator is annoyed by the glare of sun, or the rays of light from the headlights of an approaching vehicle, the anti-glare screen 13 is rotated until it assumes the horizontal position shown in full lines in Figure 1, whereby the eyes of the operator will be shielded from the glare of the light rays. When the screen is moved it is desirable that the wing nut 20 being given a partial rotation and when the screen is placed in the proper position the nut tightened thereby preventing undue wear of the attaching mechanism.

It is to be understood that the form of my invention, herewith shown and described is to be taken as the preferred example of the same, and that various changes as to the shape, size and arrangement of parts may be resorted to without departing from the spirit of the invention, or the scope of the subjoined claims.

Having thus described my invention, I claim:

1. An anti-glare device for automobile windshields, comprising an anti-glare screen, a support for the screen comprising a central conical base member having a bore formed therethrough, a bolt slidably projected through the bore of the base externally screw-threaded at its outer end and having a disk secured to its inner end, the said disk being secured to the windshield by means of an adhesive, a washer positioned over the outwardly projecting end of the bolt and mounted against the base member, and a resilient washer mounted on the outer end of the bolt adapted to bear against the outer side of the screen and means for maintaining the same in position.

2. An anti-glare device for automobile windshields, comprising a support structure including a central conical base member having its outer end screw-threaded and having a rubber disk secured to its inner end, the said disk being secured to the windshield by adhesive and similarly secured to the contacting side of the base member, a metallic spacing washer having an opening therethrough positioned over the bolt against the outer side of the base member, an anti-glare screen having an opening adjacent one end positioned over the bolt against the spacing washer, a cup-shaped washer of resilient construction positioned against the outer side of the screen over the bolt, and a wing nut threadedly mounted on the outer end of the bolt adapted to permit adjustable movement of the screen to any desirable position on the windshield.

In testimony whereof I affix my signature.

MAURICE L. MUNCIE.